(12) United States Patent
Kim

(10) Patent No.: US 7,375,928 B2
(45) Date of Patent: May 20, 2008

(54) DISK DRIVE ACTUATOR LATCH APPARATUS AND METHOD

(75) Inventor: Youn-tai Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 536 days.

(21) Appl. No.: 11/139,569

(22) Filed: May 31, 2005

(65) Prior Publication Data

US 2005/0264940 A1    Dec. 1, 2005

(30) Foreign Application Priority Data

Jun. 1, 2004    (KR)    .................. 10-2004-0039628

(51) Int. Cl.
*G11B 5/54*    (2006.01)
(52) U.S. Cl. .................................. 360/256.3
(58) Field of Classification Search ............... None
See application file for complete search history.

(56) References Cited

U.S. PATENT DOCUMENTS

| | | | | |
|---|---|---|---|---|
| 4,725,907 | A | * | 2/1988 | Jue ........................ 360/256.3 |
| 4,833,550 | A | * | 5/1989 | Takizawa et al. ............. 360/75 |
| 5,003,422 | A | * | 3/1991 | Sun et al. ................ 360/256.2 |
| 5,448,435 | A | * | 9/1995 | Nakazawa et al. ....... 360/256.3 |
| 5,523,910 | A | * | 6/1996 | von Alten ................ 360/256.3 |
| 5,671,104 | A | * | 9/1997 | Takahashi et al. ....... 360/256.3 |
| 5,734,527 | A | | 3/1998 | Rinhart |
| 6,317,296 | B1 | * | 11/2001 | Stefansky et al. ....... 360/256.2 |

FOREIGN PATENT DOCUMENTS

| | | |
|---|---|---|
| JP | 7-114779 | 5/1995 |
| JP | 2000-315368 | 11/2000 |
| JP | 2002-222573 | 8/2002 |
| KR | 96-15437 | 5/1996 |
| KR | 1998-10577 | 5/1998 |

* cited by examiner

*Primary Examiner*—Angel Castro
(74) *Attorney, Agent, or Firm*—Staas & Halsey LLP

(57) ABSTRACT

An actuator latch apparatus for a disk drive. The latch apparatus includes a metal piece disposed at one end of the swing arm, an attracting part protruded from an edge of the yoke, for attracting the metal piece by a magnetic force of the magnet, a hole formed at a position corresponding to the metal piece of the attracting part, for leaking magnetic flux flowing through the attracting part, a core disposed to move through the hole, and a core transfer device for transferring the core in one direction such that a leading end portion of the core is inserted into the hole when the disk drive operates, and for transferring the core in an opposite direction such that the core is released from the hole when the disk drive is stopped. Accordingly, a locking state of the actuator can be maintained more stably and released more easily.

17 Claims, 6 Drawing Sheets

DISK DRIVE ACTUATOR LATCH APPARATUS AND METHOD

CROSS-REFERENCE TO RELATED APPLICATIONS

This application claims the priority of Korean Patent Application No. 10-2004-0039628, filed on Jun. 1, 2004, in the Korean Intellectual Property Office, the disclosure of which is incorporated herein in its entirety by reference.

BACKGROUND OF THE INVENTION

1. Field of the Invention

Embodiments of the present invention relate to a disk drive, and more particularly, to an actuator latch apparatus and a disk drive, with the same, locking an actuator in a predetermined position when a disk is not rotating, such that the actuator is prevented from arbitrarily rotating, e.g., due to an impact.

2. Description of the Related Art

A hard disk drive (HDD) is one of the data storage devices of a computer. The HDD reproduces data from a rotating disk and records data on the disk with a read/write head. In such an HDD, the read/write head reaches a desired position while moving above a recording surface of the rotating disk by way of an actuator and then executes the reproducing/recording functions.

Meanwhile, when the HDD is not operating, that is, when the disk is not rotating, the read/write head is parked off the recording surface of the disk in order to prevent a collision with the recording surface of the disk. Such head parking systems can be classified into a contact start-stop (CSS) system and a ramp loading system. In the CSS system, a parking zone in which data is non-recordable is provided along an inner circumference of the disk and the read/write head is parked in close contact with the parking zone. In the ramp loading system, the read/write head is parked on a ramp, which is installed along the outside the disk.

When the read/write head is parked on the parking zone or the ramp, the disk may randomly rotate, e.g., due to an impact or vibration, such that the read/write head is forced out of the parking zone or the ramp and onto the recording surface of the disk. In this case, the read/write head can make forceful contact with the recording surface of the disk, such that the read/write head and the recording surface may be damaged. Therefore, when the read/write head is parked on the parking zone or the ramp, the actuator should be locked in a predetermined position so that it cannot rotate arbitrarily. For this purpose, various kinds of actuator latch apparatuses have been provided in the HDD field.

Figure 1:
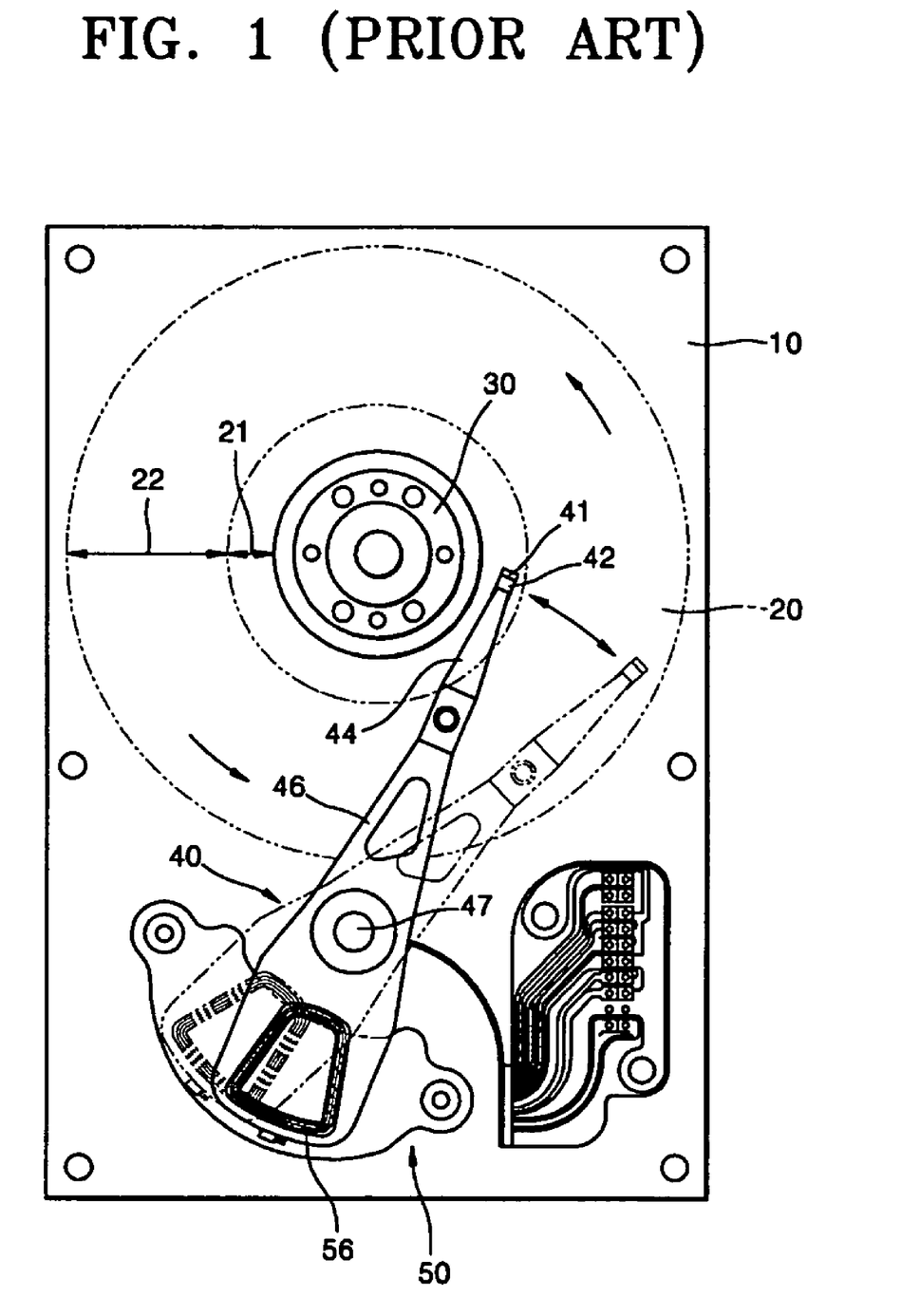
FIG. 1 schematically illustrates a conventional HDD.
Figure 2:
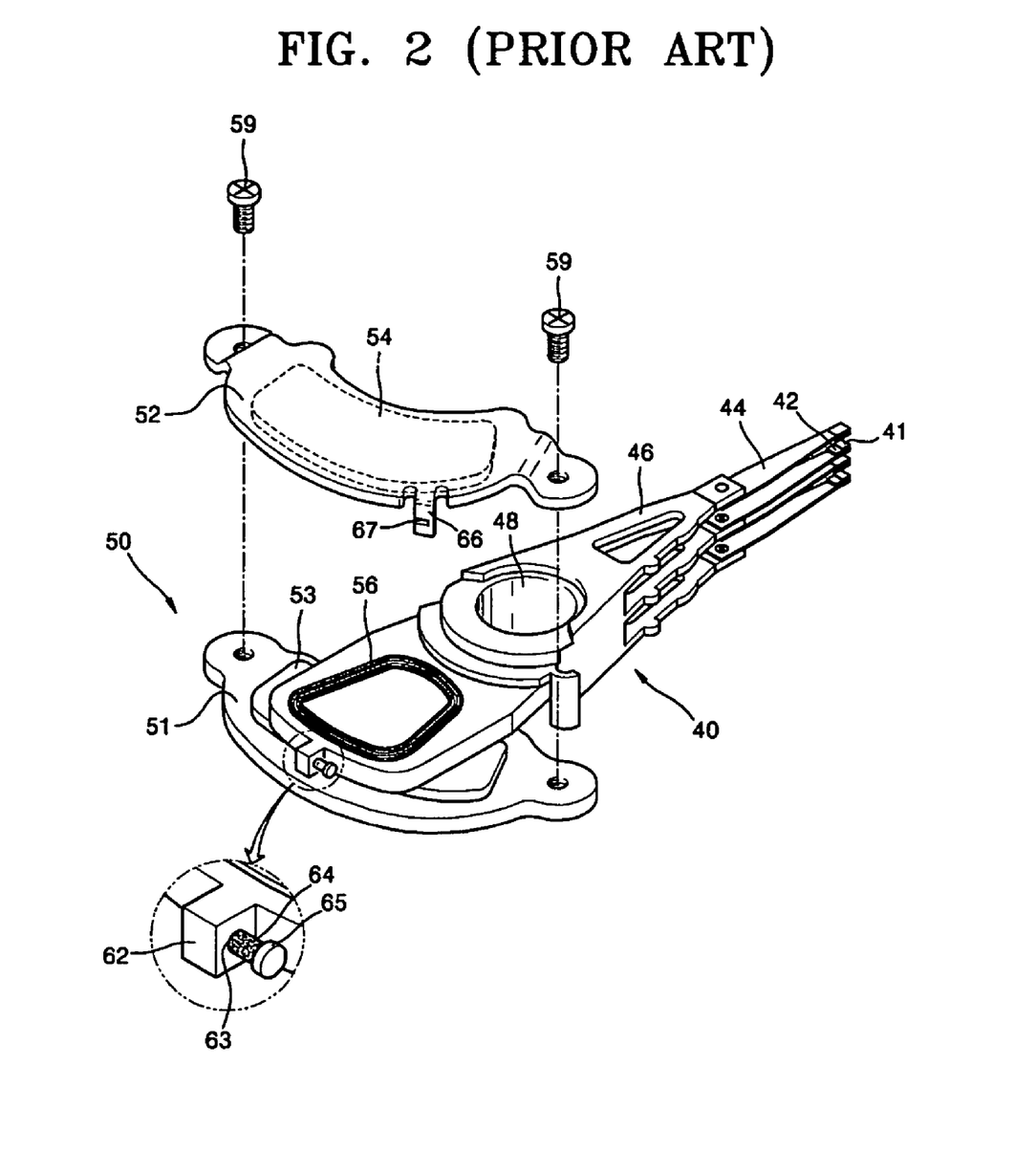
FIG. 2 is a partial exploded perspective view of the HDD shown in FIG. 1.
Figure 3:
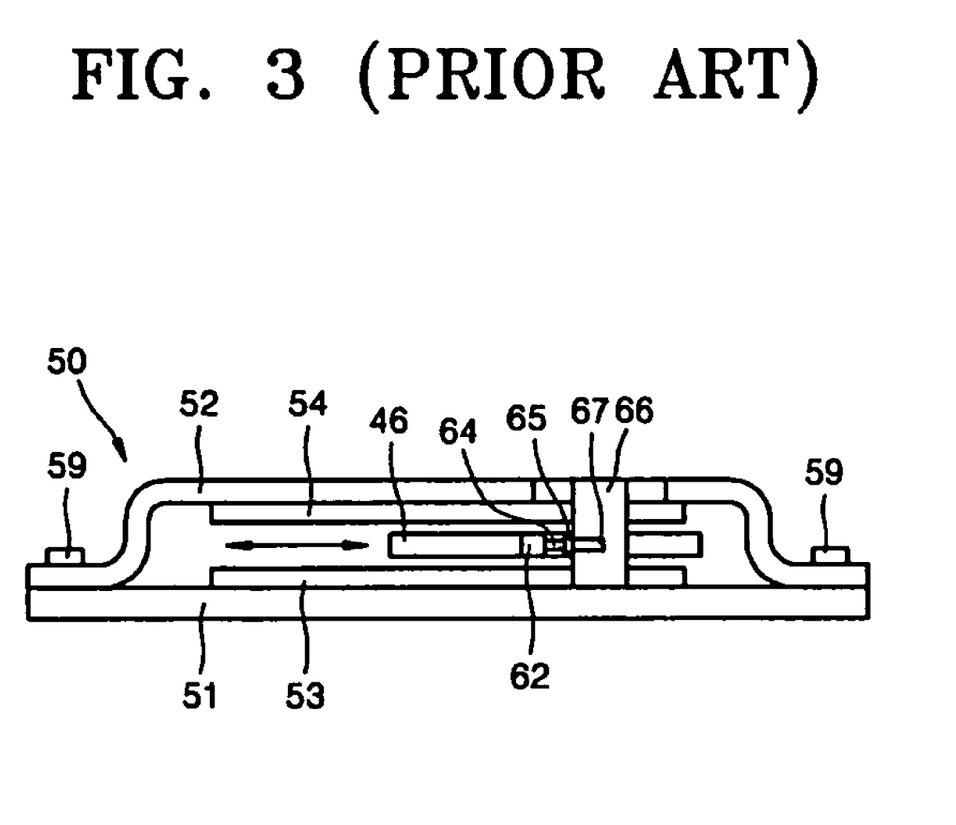
FIG. 3 is a side view of a VCM illustrating a conventional actuator latch apparatus.

FIG. 1 is a plane view schematically showing a HDD having a CSS head parking system according to the related art, FIG. 2 is a partial exploded perspective view of the HDD shown in FIG. 1, and FIG. 3 is a side view of a voice coil motor (VCM), illustrating an actuator latch apparatus according to the related art.

Referring to FIGS. 1 and 2, the HDD includes a disk 20 for recording data, a spindle motor 30 installed on a base member 10 to rotate the disk 20, and an actuator 40 provided with a read/write head 41. The read/write head 41 reads data from the disk 20 and writes data on the disk 20.

There are usually one or more stacked disks 20, with an evenly spaced relationship therebetween, and with the spindle motor 30 rotating the one or more disks 20. The disk 20 can be provided with a parking zone 21 along an inner circumference of data zone 22. When power is off, a slider 42 mounted with the read/write head 41 can be stably parked on the parking zone 21.

The actuator 40 is provided with a swing arm 46 that has a pivot hole 48, in a central portion thereof, such that the actuator 40 can be mounted rotatably about a pivot 47 installed on the base member 10. A suspension 44 is mounted on one end of the swing arm 46 to elastically bias the slider 42 toward a surface of the disk 20, in which the read/write head 41 is mounted on the slider 42.

A voice coil motor (VCM) 50 rotates the actuator 40. The VCM 50 includes a VCM coil 56 coupled to the other end portion of the swing arm 46, magnets 53 and 54 respectively positioned above and under the VCM coil 56, facing the VCM coil 56, a lower yoke 51 on which the magnet 53 is attached, and an upper yoke 52 on which the magnet 54 is attached. Screws 59 secure the lower and upper yokes 51 and 52 to the base member 10.

When the data recording and reproducing operations are executed, two forces, a lift force generated by the rotation of the disk 20 and an elastic force of the suspension 44, act on the slider 42, such that the slider 42 is lifted above the data zone 22 of the disk 20, with a height at which the lift and elastic forces are balanced, thereby allowing the read/write head 41 to read/write data from/to the rotating disk 20 while maintaining a predetermined distance therebetween.

Meanwhile, since the lift force lifting the slider 42 disappears when the HDD is powered down, such that the disk 20 is not rotating, the slider 42 must be taken from the data zone 22 before the lift force disappears, in order to prevent the data zone 22 from being damaged by coming into contact with the slider 42. In other words, if the VCM 50 rotates the swing arm 46 of the actuator 40 to move the slider 42 to the parking zone 21, before the rotation of the disk 20 stops, the slider 42 can be parked at the parking zone 21 when the disk 20 stops, thereby preventing damage of the data zone 21.

Referring to FIGS. 2 and 3, the HDD can be provided with an actuator latch apparatus that locks the actuator 40 to prevent rotation thereof after the slider 42 is parked on the parking zone 21 of the disk 20. That is, when the power is off, the actuator latch apparatus prevents the actuator 40 from arbitrarily rotating, e.g., due to an impact or vibration, such that the read/write head 41 can be prevented from escaping from the parking zone 21 and moving onto the data zone 22.

The actuator latch apparatus is a magnetic latch apparatus that uses the magnetic force of the magnet, 53 and 54. The actuator latch apparatus includes a metal piece 65 installed in an end of the swing arm 46 and an attracting part 66 formed in the upper yoke 52, for attracting the metal piece 65 with the magnetic force.

The installation structure of the metal piece 65 includes a protrusion 62 formed on the end of the swing arm 46, a damper insertion hole 63 formed through the protrusion 62 in a horizontal direction, a damper 64 securely inserted in the damper insertion hole 63, and the metal piece 65 attached on an end of the damper 64. The damper 64 decreases the amplitude of any impact generated when the metal piece 65 collides with the attracting part 66.

The attracting part 66 protrudes from an edge of the upper yoke 52 and is bent downward to meet a top surface of the lower yoke 51. A slot 67 can be formed in the attracting part 66, at a corresponding position to the metal piece 65, with a predetermined width. The magnets 53 and 54 can generate magnetic flux in the attraction part 66. Herein, a magnetic flux leakage takes place at the slot 67 and the magnetic flux leakage causes the metal piece 65 of the swing arm 46 to stick on the attracting part 66, thereby locking the actuator 40.

When the power is off, the metal piece 65 is caused to come into contact with the attracting part 66 by the magnetic force, such that the actuator 40 can be locked. Herein, a large latch force is suitable to prevent the attached metal piece 65 from being detached from the attracting part 66, e.g., due to an impact. Meanwhile, when the power is on, the actuator 40 also has to be unlocked to move the read/write head 41 to the data zone 22 of the disk 20. Herein, a small latch force would be suitable to easily detach the metal piece 65 from the attracting part 66.

However, if the actuator latch apparatus is designed to have the large latch force for a reliable locking of the actuator 40, a large torque has to be impulsively exerted on the actuator 40 in order to detach the metal piece 65 of the swing arm 46 from the attracting part 66, and therefore, available maximum current flows through the coil 56 coupled to the swing arm 46 to generate the large torque. However, because of the inertia force of the large torque, the swing arm 46 rotates fast enough that it collides with a stopper (not shown), even after the metal piece 65 of the swing arm 46 is detached from the attraction part 66, causing a "head slap" to occur. The head slap is a phenomenon in that the read/write head 41 of the actuator 40 collides with the surface of the disk 20, e.g., by an impact or vibration, such that the head slap can cause damage to the read/write head 41 or the surface of the disk 20. Therefore, to prevent the head slap, a brake needs to be applied to the swing arm 46 immediately after the detachment of the metal piece 65 and the attracting part 66. However, it is very difficult to control servo current, for applying the brake to the swing arm 46.

Thus, to provide a stable and reliable locking and unlocking operation of the actuator, there is required an improved actuator latch apparatus, in which a large latch force is applied when locking the actuator and only a small latch force needs to be applied when unlocking the actuator.

SUMMARY OF THE INVENTION

Embodiments of the present invention provide a disk drive and a corresponding actuator latch apparatus that can change latch forces depending on locking or unlocking of an actuator.

To achieve the above and/or other aspects and advantages, embodiments of the present invention set forth an actuator latch apparatus locking an actuator, the actuator including a swing arm, a VCM coil coupled to one end of the swing arm, a magnet disposed facing the VCM coil, and a yoke supporting the magnet, the actuator latch apparatus including a swing arm protrusion disposed on the swing arm, an attracting part, protruding from the yoke, for attracting the swing arm protrusion by a magnetic force of the magnet, a hole formed in the attracting part, at a position corresponding to the swing arm protrusion, for leaking magnetic flux flowing through the attracting part, a core disposed to move through the hole, and a core transfer device transferring the core such that a leading end portion of the core is inserted into the hole when a disk drive is operating, and for transferring the core such that the core is released from the hole when the disk drive is not operating.

The core transfer device may include a bobbin enclosing the core and movably supporting the core, a solenoid coil wound on an outer circumference of the bobbin, and a permanent magnet, disposed adjacent to a rear end portion of the bobbin, for magnetically attracting the core. When a current is not applied to the solenoid coil, the core may be magnetically drawn toward the permanent magnet and released from the hole, and when a current is applied to the solenoid coil, the rear end of the core may be magnetized to a polarity corresponding to the permanent magnet and the core is repulsed from the permanent magnet to insert the leading end portion of the core into the hole.

The magnetic attraction exerted by the permanent magnet upon the core may be greater than a magnetic force exerted by the attracting part upon the core. In addition, the yoke may include an upper yoke disposed above the VCM coil and a lower yoke disposed below the VCM coil, with the core transfer device being installed at the lower yoke. The lower yoke may have a supporting part supporting the core transfer device. Further, the bobbin and the permanent magnet may be fixed on an upper surface of the supporting part.

The hole may have a circular shape of which a side is opened toward the swing arm protrusion, and the core may have a circular section corresponding to the circular shape of the hole.

The swing arm protrusion may further include a damper with a magnetic material being attached to an end of the damper to be magnetically interactive with the attracting part. The yoke may include an upper yoke disposed above the VCM coil and a lower yoke disposed below the VCM coil, with the attracting part being protruding from an edge of the upper yoke and bent such that an end of the attracting part contacts an upper surface of the lower yoke.

To achieve the above and/or other aspects and advantages, embodiments of the present invention set forth a disk drive, including a read and/or write head for reading and/or writing from/to a disk, and an actuator including an actuator latch apparatus locking the actuator, the actuator latch apparatus including a swing arm protrusion disposed on a swing arm of the actuator, an attracting part, protruding from a yoke of the actuator, for magnetically attracting the swing arm protrusion, and a magnetic interfering apparatus selectively located near the attracting part to lower the magnetic attraction between the swing arm protrusion and the attracting part thereby reducing a required torque necessary to distance the swing arm protrusion from the attracting part for unlocking the actuator latch apparatus.

The magnetic interfering apparatus may include a portion corresponding a hole of the attracting part leaking magnetic flux flowing through the attracting part, wherein the lowering of the magnetic attraction between the swing arm protrusion and the attracting part is implemented by inserting the portion of the magnetic interfering apparatus into the hole of the attracting part.

To achieve the above and/or other aspects and advantages, embodiments of the present invention set forth an actuator latch locking method for an actuator, the actuator including a swing arm, a VCM coil coupled to one end of the swing arm, a magnet disposed facing the VCM coil, and a yoke supporting the magnet, the actuator latch method including magnetically attracting a swing arm protrusion, disposed on the swing arm, by a hole formed in an attracting part of the yoke leaking magnetic flux flowing through the attracting part, and transferring a leading portion of a core into the hole when a disk drive is operating to reduce a magnetic force between the swing arm protrusion and the attracting part to control the leaking of magnetic flux and transferring the leading portion of the core from the hole when the disk drive is not operating to withdraw the reduction in magnetic force.

When a current is not applied to a solenoid coil controlling the transferring of the core, the core may be magnetically drawn toward a permanent magnet away from the attracting part and is released from the hole, and when a current is applied to the solenoid coil, a rear portion of the core may be magnetized to a polarity corresponding to the permanent magnet and the core is repulsed from the permanent magnet to insert the leading portion of the core into the hole. In addition, a magnetic attraction exerted by the permanent magnet upon the core may be greater than a magnetic force exerted by the attracting part upon the core.

To achieve the above and/or other aspects and advantages, embodiments of the present invention set forth a disk drive operating method, including reading and/or writing from/to a disk by a read and/or write head, and selectively locking an actuator supporting the read and/or write head, the locking including magnetically attracting a swing arm protrusion, disposed on a swing arm of the actuator, to an attracting part, protruding from a yoke of the actuator, by selectively locating a magnetic interfering apparatus near the attracting part to lower the magnetic attraction between the swing arm protrusion and the attracting part thereby reducing a required torque necessary to distance the swing arm protrusion from the attracting part for unlocking the actuator latch apparatus, and moving the magnetic interfering apparatus away from the attracting part to increase the magnetic attraction between the swing arm protrusion and the attracting part for locking the actuator.

The magnetic interfering apparatus may include a portion corresponding a hole of the attracting part leaking magnetic flux flowing through the attracting part, wherein the method further includes lowering the magnetic attraction between the swing arm protrusion and the attracting part by inserting the portion of the magnetic interfering apparatus into the hole of the attracting part.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
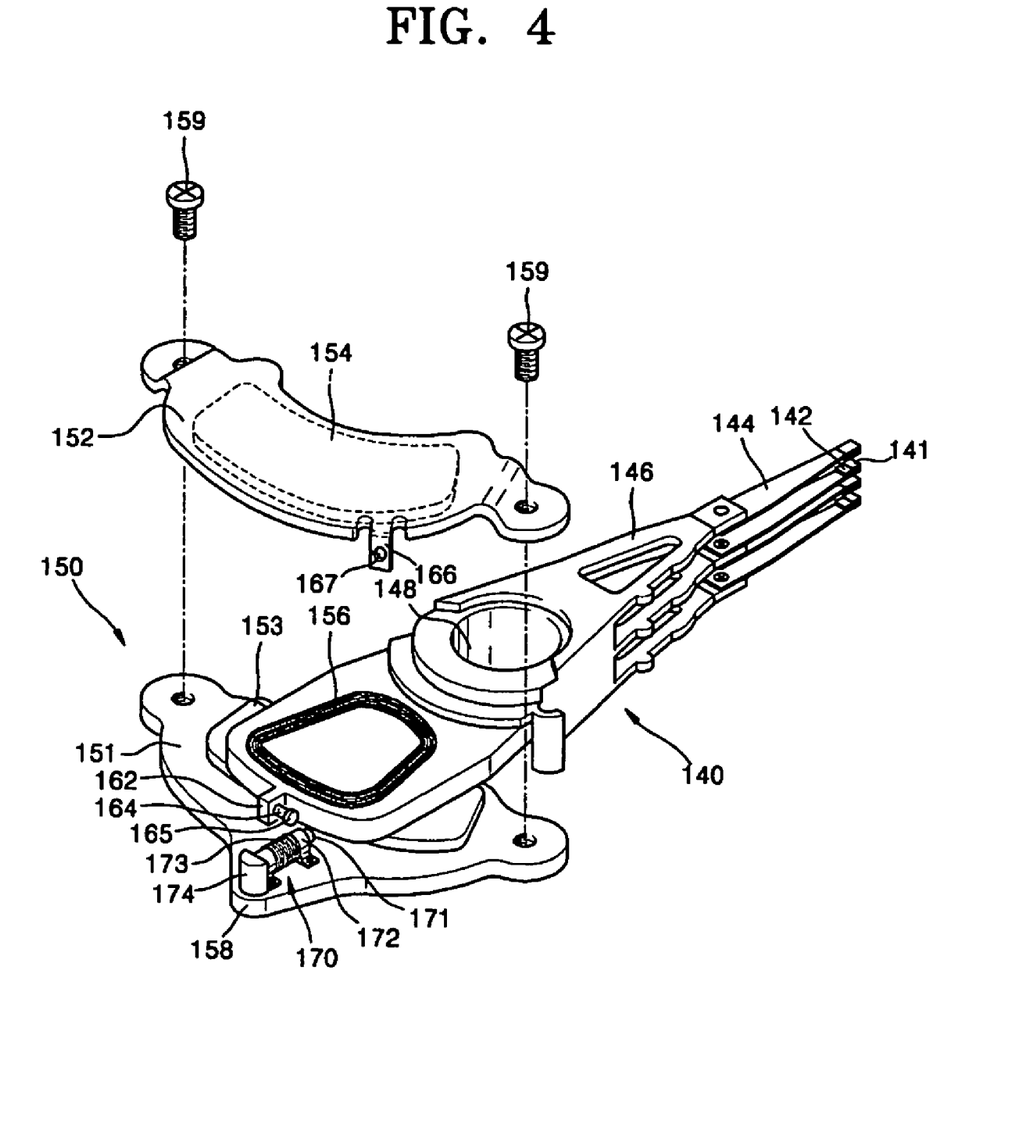
FIG. 4 is an exploded perspective view of an actuator provided with an actuator latch apparatus according to an embodiment of the present invention.
Figure 5:
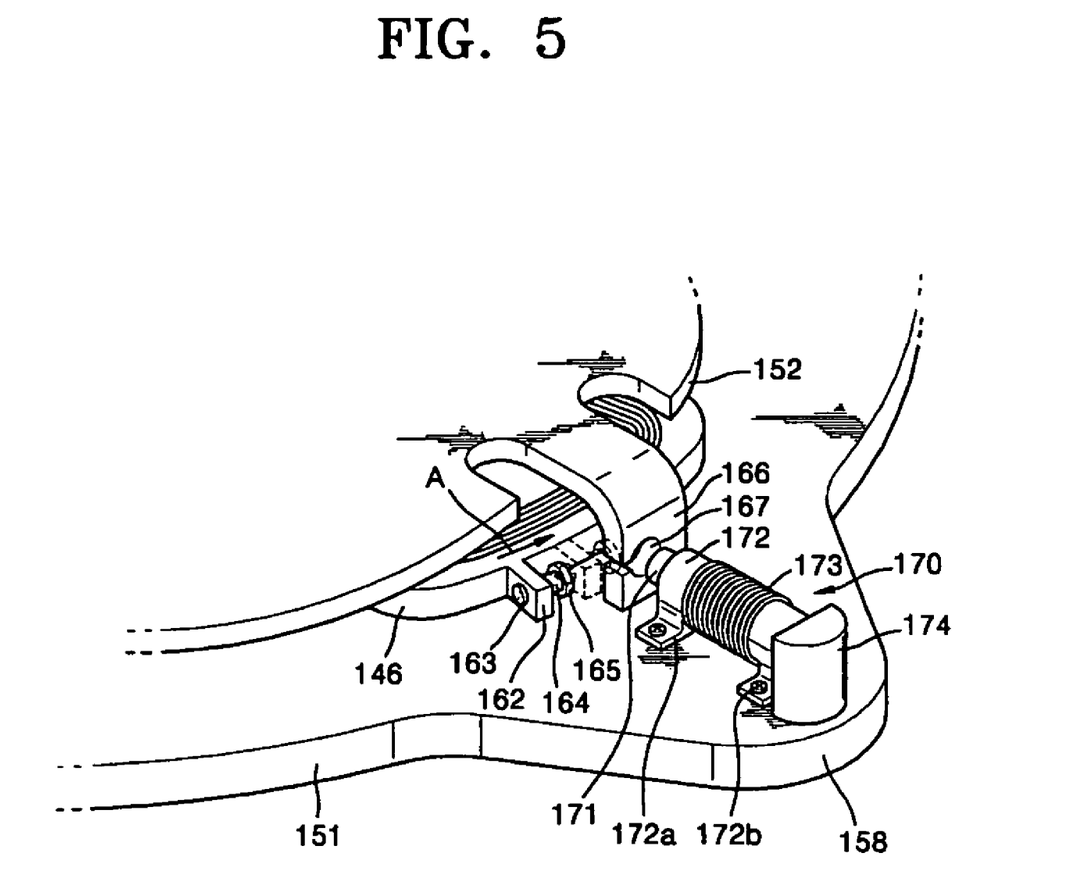
FIG. 5 is an enlarged perspective view of the actuator latch apparatus shown in FIG. 4.

FIG. 4 is an exploded perspective view of an actuator provided with an actuator latch apparatus, according to an embodiment of the present invention, and FIG. 5 is an enlarged perspective view of the actuator latch apparatus shown in FIG. 4.

Referring to FIGS. 4 and 5, an HDD can be provided with an actuator 140, carrying a read/write head 141 to a desired position of a disk. The actuator 140 is provided with a swing arm 146, rotatably installed on a base member of the HDD. The swing arm 146 is formed with a pivot hole 148, in a central portion thereof, for the rotatable installation. The swing arm 146 can usually be made by a plastic injection molding process or metal sheet (e.g. aluminum sheet) press and machine process. The swing arm 146 is mounted with a suspension 144 at a leading end, the suspension 144 elastically supports a slider 142 toward a surface of the disk, and the read/write head 141 is mounted on slider 142.

The actuator 140 is provided with a voice coil motor (VCM) 150 to rotate the swing arm 146. The VCM 150 includes a VCM coil 156 coupled to a rear portion of the swing arm 146, a lower yoke 151 disposed under the VCM coil 156, an upper yoke 152 disposed above the VCM coil 156, a magnet 153 attached to the top of the lower yoke 151, and a magnet 154 attached to the bottom of the upper yoke 152. The lower yoke 151 can be mounted on the base member of the HDD, and spaced away from the VCM coil 156 by a predetermined distance. The upper yoke 152 can be coupled to the lower yoke 151 by using screws 159. The magnets 153 and 154, usually permanent magnets, can be spaced apart from the VCM coil 156 by a predetermined distance. Alternatively, instead of using the two magnets 153 and 154, just one magnet may be installed above or under the VCM coil 156, for example.

The VCM 150 rotates the swing arm 146 in a direction based on Fleming's left hand rule through an interaction between the current input to the VCM coil 156 and the magnetic field induced by the magnets 153 and 154.

In case of the HDD having the aforementioned CSS system, if the HDD is supplied with power and the disk begins to rotate, the VCM 150 can rotate the swing arm 146 in a clockwise direction, such that the read/write head 141 moves from a parking zone of the disk to a data zone of the disk, for example. On the other hand, if the power supplied to the disk drive is cut off, and the disk stops rotating, the VCM 150 can rotate the swing arm 146 in a counterclockwise direction, such that the read/write head 141 moves from the data zone to the parking zone. As a result, the read/write head 141 can be settled in the parking zone.

In the case of the HDD having the aforementioned ramp loading system, if the HDD is supplied with power and the disk begins to rotate, the VCM 150 can rotate the swing arm 146 in a counterclockwise direction, such that the read/write head 141 moves from a ramp, provided along an outside of the disk, toward the data zone of the disk. On the other hand, if the power supplied to the disk drive is cut off and the disk stops rotating, the VCM 150 rotates the swing arm 146 in a clockwise direction, such that the read/write head 141 moves from the data zone of the disk to the ramp and settles in the ramp.

The HDD having the above-described actuator 140 can include an actuator latch apparatus according to embodiments of the present invention. When the operation of the HDD is stopped, the actuator latch apparatus locks the actuator 140. In other words, the actuator latch apparatus prevents the read/write head 141 from escaping from the parking zone toward the data zone of the disk, e.g., due to an unnecessary rotation of the actuator 140, which may be caused by an impact when the rotation of the disk has stopped, for example.

The actuator latch apparatus may include a metal piece 165 installed on a rear end of the swing arm 146, an attracting part 166 formed on the upper yoke 152, a magnetic flux leakage hole 167 formed in the attracting part 166, a core 171 disposed to move through the hole 167, and a core transfer device 170.

When the disk is stopped, the metal piece 165 approaches the attracting part 166 as the swing arm 146, rotates toward the parking zone, and comes into contact with the attracting part 166 through the magnetic force of the magnets 153 and 154.

The metal piece 165 can be supported by a protrusion 162, formed on an end of the swing arm 146. In detail, the protrusion 162 can be installed with a damper 164 and the metal piece 165 can be attached on an end of the damper 164. The damper 164 is securely inserted in a damper insertion hole 163, which is formed in the protrusion 162 in a horizontal direction, for example. The damper 164 functions to decrease the amplitude of any impact generated when the metal piece 165 collides with the attracting part 166, and the damper 164 can be made of shock absorbing materials, such as a rubber, for example.

When the disk rotation is stopped, the attracting part 166 functions to attracting the metal piece 165 with the magnetic force of the magnets 153 and 154. The attracting part 166 protrudes from an edge of the upper yoke 152 and is bent downward to meet a top surface of the lower yoke 151.

The hole 167 is formed in the attracting part 166 at a corresponding position to the metal piece 165, and a magnetic flux flowing in the attracting part 166 can leak at the hole 167. Though the shape of the hole 167 is not limited, the hole 167 may be formed into circular shape with an opening toward the metal piece 165. The magnets 153 and 154 make the magnetic flux flowing in the attracting part 166. Herein, the magnetic flux leakage at the hole 167 forms a strong magnetic field and the strong magnetic field causes the metal piece 165 to stick to the attracting part 166, thereby locking the actuator 140.

The hole 167 may be formed to be wider compared to a conventional slot, such that the magnetic field formed by the magnetic flux leakage is more strong than in conventional systems. Therefore, when the disk is not rotating, the attracting part 166 more strongly attracts the metal piece 165. That is, the latch force becomes stronger and, thus, a stable and reliable locking of the actuator 140 can be provided even when the actuator 140 is applied with a strong impact.

The core 171 is supported movably in forward and backward directions by the core transfer device 170. The core 171 may have a circular section, of the same shape as the hole 167, with a slightly smaller diameter than that of the hole 167 for an easy movement of the core 171 through the hole 167, for example. Further, the core 171 may be made of a magnetic substance such as an iron core, for allowing a permanent magnet 174 to attract the core 171.

The core transfer device 170 may have various constructions. For example, the core transfer device 170 may include a bobbin 172 surrounding and supporting the core 171, a solenoid coil 173 wound around the bobbin 172, and the permanent magnet 174 disposed to closely face a rear of the bobbin 172.

The core transfer device 170 may be installed on the lower yoke 151. In detail, a supporting part 158, extending from the lower yoke 151 in a horizontal direction, can support the core transfer device 170.

The bobbin 172 can be secured on a top of the supporting part 158, and the core 171 may be inserted in the bobbin 172 for moving forward and backward. For example, the bobbin 172 can be provided with brackets 172a and screws 172b, to secure the bobbin 172 on the top of the supporting part 158 of the lower yoke 151, such that the bobbin 172 can be strongly secured on the supporting part 158.

When a current is applied to the solenoid coil 173, disposed around the bobbin 172, the core 171 in the bobbin 172 becomes magnetized.

The permanent magnet 174 is disposed close to the rear of the bobbin 172, as described above, and can be fixed on the top of the supporting part 158. The permanent magnet 174 then attracts the core 171 by its magnetic force.

When a disk begins to rotate, the core transfer device 170 forces the core 171 to move toward the hole 167 in order to insert a leading end portion of the core 171 into the hole 167. Conversely, when the drive is not rotating, the core transfer device 170 forces the core 171 to move back from the hole 167. The placement of the leading end portion of the core 171 in the vicinity of metal piece 165 and attracting part 166 causes a weakening of the magnetic attraction between the metal piece 165 and the attracting part 166, thereby reducing the required torque necessary to move the actuator from the locked location.

Thus, an operation of the actuator latch apparatus will now be described more fully with reference to FIGS. 5, 6A and 6B, according to an embodiment of the present invention.

Figure 6A:
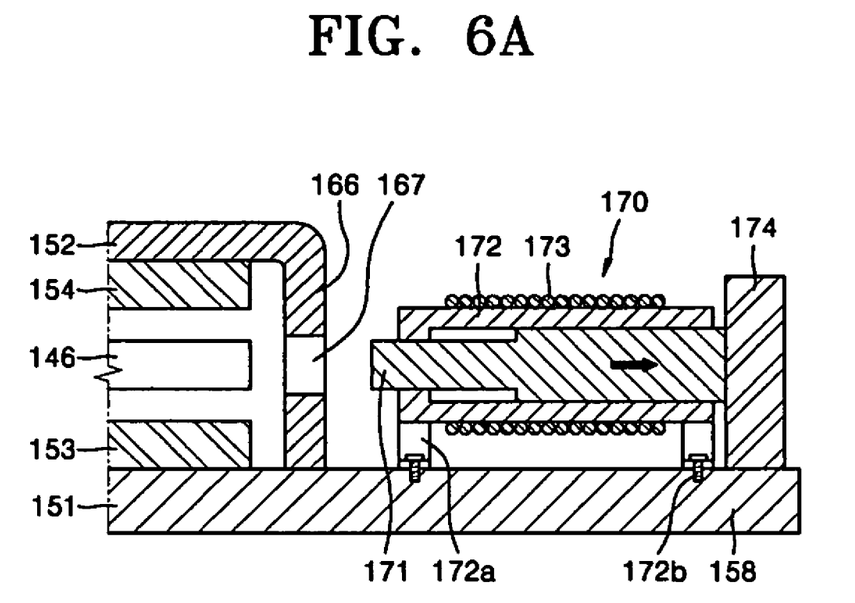
FIGS. 6A and 6B are sectional views illustrating an operation of an actuator latch apparatus, according to an embodiment of the present invention.
Figure 6B:
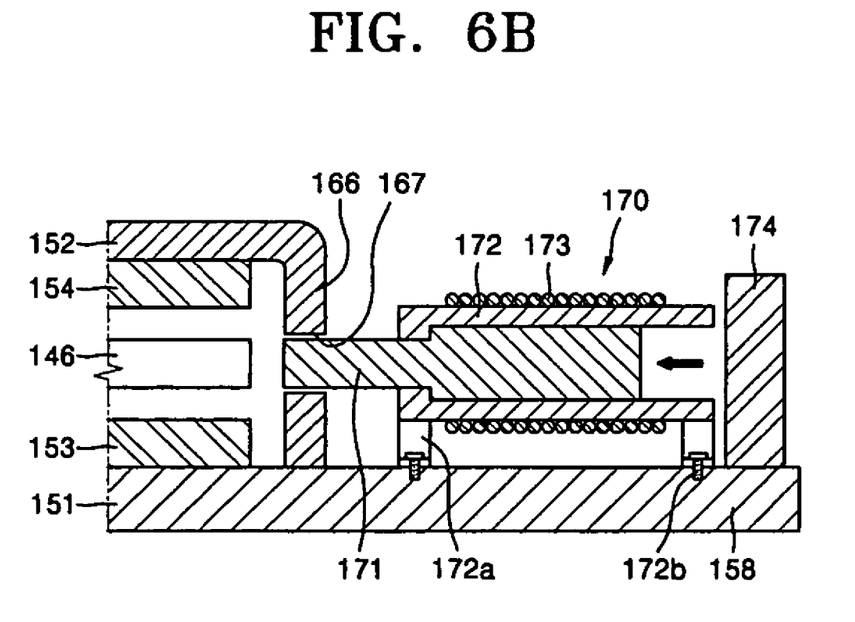

FIGS. 6A and 6B illustrate an operation of the actuator latch apparatus.

Referring to FIGS. 5 and 6A, when the power supplied to the HDD is turned off and the actuator 140 begins to rotate toward the parking zone, the current applied to the solenoid coil 173 of the core transfer device 170 is cut, and the core 171 moves back toward the permanent magnet 174 by an attractive magnetic force of the permanent magnet 174, such that the leading end portion of the core 171 is disengaged from the hole 167 of the attracting part 166.

Herein, since the core 171 is attracted by the magnetic force of the attracting part 166, as well as the magnetic force of the permanent magnet 174, the magnetic force of the permanent magnet 174 is stronger than that of the attracting part 166, such that the core 171 can be easily transferred back toward the permanent magnet 174.

Immediately after the core 171 disengages from the hole 167, the metal piece 165 transfers in the direction of arrow "A" shown in FIG. 5 and attaches to the attracting part 166 by the rotation of the swing arm 146. As described above, a strong latch force can be applied between the metal piece 165 and the attracting part 166, such that the actuator 140 can be more stably and reliably locked, even if the actuator 140 is applied with a strong impact.

Referring to FIGS. 5 and 6B, when power is turned on to operate the HDD, a current is applied to the solenoid coil 173, of the core transfer device 170, to magnetize the core 171 to have the same polarity at a rear end as the permanent magnet 174. Therefore, since the rear end of the core 171 and the permanent magnet 174 have same polarity, a repulsive force is generated between the core 171 and the permanent magnet 174 and the core 171 is caused to move away form the permanent magnet 174, such that the leading end portion of the core 171 can be inserted in the hole 167.

When the leading end portion of the core 171 is inserted in the hole 167, the hole 167 is almost closed by the core 171, such that the magnetic flux leakage of the hole 167 can be remarkably reduced. Therefore, again, the attracting force (latch force) acting between the metal piece 165 and the attracting part 166 is also reduced, such that the metal piece 165 can be easily detached from the attracting part 166.

As described above, the actuator latch apparatus and HDD of embodiments of the present invention can lock the actuator 140 with a stronger latch force when power is off, such that the stable locking of the actuator can be maintained even when the actuator 140 is applied with a strong impact. Further, when power is on and the disk begins to rotate, the actuator latch apparatus and HDD of embodiments of the present invention can reduce the latch force, such that the actuator 140 can be easily unlocked even with a small current, thereby obviating difficulties of servo control presented in conventional systems.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator latch apparatus locking an actuator, the actuator including a swing arm, a VCM coil coupled to one end of the swing arm, a magnet disposed facing the VCM coil, and a yoke supporting the magnet, the actuator latch apparatus comprising:
   a swing arm protrusion disposed on the swing arm;
   an attracting part, protruding from the yoke, for attracting the swing arm protrusion by a magnetic force of the magnet;
   a hole formed in the attracting part, at a position corresponding to the swing arm protrusion, for leaking magnetic flux flowing through the attracting part;
   a core disposed to move through the hole; and
   a core transfer device transferring the core such that a leading end portion of the core is inserted into the hole when a disk drive is operating, and for transferring the core such that the core is released from the hole when the disk drive is not operating.

2. The actuator latch apparatus of claim 1, wherein the core transfer device comprises:
   a bobbin enclosing the core and movably supporting the core;
   a solenoid coil wound on an outer circumference of the bobbin; and
   a permanent magnet, disposed adjacent to a rear end portion of the bobbin, for magnetically attracting the core.

3. The actuator latch apparatus of claim 2, wherein when a current is not applied to the solenoid coil, the core is magnetically drawn toward the permanent magnet and is released from the hole, and when a current is applied to the solenoid coil, the rear end of the core is magnetized to a polarity corresponding to the permanent magnet and the core is repulsed from the permanent magnet to insert the leading end portion of the core into the hole.

4. The actuator latch apparatus of claim 2, wherein the magnetic attraction exerted by the permanent magnet upon the core is greater than a magnetic force exerted by the attracting part upon the core.

5. The actuator latch apparatus of claim 2, wherein the yoke comprises an upper yoke disposed above the VCM coil and a lower yoke disposed below the VCM coil, with the core transfer device being installed at the lower yoke.

6. The actuator latch apparatus of claim 5, wherein the lower yoke has a supporting part supporting the core transfer device.

7. The actuator latch apparatus of claim 6, wherein the bobbin and the permanent magnet are fixed on an upper surface of the supporting part.

8. The actuator latch apparatus of claim 1, wherein the hole has a circular shape of which a side is opened toward the swing arm protrusion, and the core has a circular section corresponding to the circular shape of the hole.

9. The actuator latch apparatus of claim 1, wherein the swing arm protrusion further comprises a damper with a magnetic material being attached to an end of the damper to be magnetically interactive with the attracting part.

10. The actuator latch apparatus of claim 1, wherein the yoke comprises an upper yoke disposed above the VCM coil and a lower yoke disposed below the VCM coil, with the attracting part being protruding from an edge of the upper yoke and bent such that an end of the attracting part contacts an upper surface of the lower yoke.

11. A disk drive, comprising:
   a read and/or write head for reading and/or writing from/to a disk; and
   an actuator comprising an actuator latch apparatus locking the actuator, the actuator latch apparatus comprising a swing arm protrusion disposed on a swing arm of the actuator, an attracting part, protruding from a yoke of the actuator, for magnetically attracting the swing arm protrusion, and a magnetic interfering apparatus selectively located near the attracting part to lower the magnetic attraction between the swing arm protrusion and the attracting part thereby reducing a required torque necessary to distance the swing arm protrusion from the attracting part for unlocking the actuator latch apparatus.

12. The disk drive of claim 11, wherein the magnetic interfering apparatus comprises a portion corresponding a hole of the attracting part leaking magnetic flux flowing through the attracting part, wherein the lowering of the magnetic attraction between the swing arm protrusion and the attracting part is implemented by inserting the portion of the magnetic interfering apparatus into the hole of the attracting part.

13. An actuator latch locking method for an actuator, the actuator including a swing arm, a VCM coil coupled to one end of the swing arm, a magnet disposed facing the VCM coil, and a yoke supporting the magnet, the actuator latch method comprising:
   magnetically attracting a swing arm protrusion, disposed on the swing arm, by a hole formed in an attracting part of the yoke leaking magnetic flux flowing through the attracting part; and
   transferring a leading portion of a core into the hole when a disk drive is operating to reduce a magnetic force between the swing arm protrusion and the attracting part to control the leaking of magnetic flux and transferring the leading portion of the core from the hole when the disk drive is not operating to withdraw the reduction in magnetic force.

14. The actuator latch method of claim 13, wherein when a current is not applied to a solenoid coil controlling the transferring of the core, the core is magnetically drawn toward a permanent magnet away from the attracting part and is released from the hole, and when a current is applied to the solenoid coil, a rear portion of the core is magnetized to a polarity corresponding to the permanent magnet and the core is repulsed from the permanent magnet to insert the leading portion of the core into the hole.

15. The actuator latch method of claim 14, wherein a magnetic attraction exerted by the permanent magnet upon the core is greater than a magnetic force exerted by the attracting part upon the core.

16. A disk drive operating method, comprising:
reading and/or writing from/to a disk by a read and/or write head; and
selectively locking an actuator supporting the read and/or write head, the locking comprising magnetically attracting a swing arm protrusion, disposed on a swing arm of the actuator, to an attracting part, protruding from a yoke of the actuator, by selectively locating a magnetic interfering apparatus near the attracting part to lower the magnetic attraction between the swing arm protrusion and the attracting part thereby reducing a required torque necessary to distance the swing arm protrusion from the attracting part for unlocking the actuator latch apparatus, and moving the magnetic interfering apparatus away from the attracting part to increase the magnetic attraction between the swing arm protrusion and the attracting part for locking the actuator.

17. The disk drive operating method of claim 16, wherein the magnetic interfering apparatus comprises a portion corresponding a hole of the attracting part leaking magnetic flux flowing through the attracting part, wherein the method further comprises lowering the magnetic attraction between the swing arm protrusion and the attracting part by inserting the portion of the magnetic interfering apparatus into the hole of the attracting part.

* * * * *